United States Patent
Tarayre et al.

(10) Patent No.: US 9,217,327 B2
(45) Date of Patent: Dec. 22, 2015

(54) TRANSMISSION SYSTEM FOR COMMUNICATION BETWEEN DOWNHOLE ELEMENTS

(75) Inventors: Christophe Tarayre, Stavanger (NO); André Johann Blindheim, Sandnes (NO); Øyvind Wetteland, Stavanger (NO)

(73) Assignee: Roxar Flow Measurement AS, Bergen (NO)

( * ) Notice: Subject to any disclaimer, the term of this patent is extended or adjusted under 35 U.S.C. 154(b) by 369 days.

(21) Appl. No.: 13/696,629

(22) PCT Filed: May 12, 2011

(86) PCT No.: PCT/EP2011/002354
§ 371 (c)(1),
(2), (4) Date: Nov. 7, 2012

(87) PCT Pub. No.: WO2011/141173
PCT Pub. Date: Nov. 17, 2011

(65) Prior Publication Data
US 2013/0048269 A1    Feb. 28, 2013

(30) Foreign Application Priority Data
May 12, 2010    (NO) .................................. 20100691

(51) Int. Cl.
*E21B 47/12*    (2012.01)
*G01V 3/10*    (2006.01)
(Continued)

(52) U.S. Cl.
CPC ............... *E21B 47/122* (2013.01); *H01Q 7/00* (2013.01); *H04B 5/0031* (2013.01); *H04B 5/0081* (2013.01)

(58) Field of Classification Search
CPC ....... E21B 47/12; E21B 47/122; E21B 3/104; G01V 3/08; G01V 3/10; G01V 3/11; G01V 3/088; G01V 3/104
USPC .......... 166/66.6, 66; 340/854.6; 324/346, 345
See application file for complete search history.

(56) References Cited

U.S. PATENT DOCUMENTS 2,350,429 A * 6/1944 Troupe ............................ 166/60
2,411,696 A * 11/1946 Silverman et al. ......... 340/853.7
3,550,682 A    12/1970 Fowler
(Continued)

FOREIGN PATENT DOCUMENTS

WO    WO-2008/069677 A2    6/2008
WO    WO-2009/040510 A2    4/2009

OTHER PUBLICATIONS

Morrish, Susan, "International Search Report" prepared for PCT/EP2011/002354 as mailed Nov. 6, 2012, 4 pages.

*Primary Examiner* — Kenneth L Thompson
(74) *Attorney, Agent, or Firm* — Winstead PC (57) ABSTRACT

The invention relates to a transmission system for transmitting signals between an inner and an outer unit separated by an annular pipe section wall, wherein said inner unit is provided with a first antenna and the second unit is provided with a second antenna, the antennas preferably constituted by coils, being adapted to be brought into essentially the same positions along the pipe section, wherein said pipe section is made from a material having low magnetic permeability and wherein at least one of the antennas is provided magnetic shield having high magnetic permeability, the corresponding antenna being positioned between the pipe wall and the magnetic shield and the magnetic shield extending along the length of the antenna.

15 Claims, 7 Drawing Sheets

(51) Int. Cl.
  *H01Q 7/00*    (2006.01)
  *H04B 5/00*    (2006.01)

(56) References Cited

U.S. PATENT DOCUMENTS

| | | | |
|---|---|---|---|
| 4,057,781 A * | 11/1977 | Scherbatskoy | 340/854.4 |
| 4,800,385 A * | 1/1989 | Yamazaki | 340/854.4 |
| 4,852,648 A * | 8/1989 | Akkerman | E21B 17/003 |
| | | | 166/66.4 |
| 4,901,069 A | 2/1990 | Veneruso | |
| 5,008,664 A * | 4/1991 | More et al. | 340/854.8 |
| 5,455,573 A * | 10/1995 | Delatorre | 340/854.8 |
| 6,188,222 B1 * | 2/2001 | Seydoux et al. | 324/339 |
| 6,249,259 B1 * | 6/2001 | Goodman et al. | 343/788 |
| 6,628,118 B1 | 9/2003 | Amini | |
| 6,684,952 B2 | 2/2004 | Brockman et al. | |
| 7,012,432 B2 * | 3/2006 | Allan | 324/333 |
| 7,063,148 B2 | 6/2006 | Jabusch | |
| 7,165,618 B2 | 1/2007 | Brockman et al. | |
| 7,170,424 B2 * | 1/2007 | Vinegar | E21B 47/12 |
| | | | 166/66 |
| 7,227,363 B2 * | 6/2007 | Gianzero et al. | 324/342 |
| 7,252,160 B2 * | 8/2007 | Dopf et al. | 175/40 |
| 7,902,955 B2 * | 3/2011 | Veneruso et al. | 336/212 |
| 2002/0105334 A1 * | 8/2002 | Aiello | 324/358 |
| 2003/0066671 A1 | 4/2003 | Vinegar et al. | |
| 2005/0189945 A1 * | 9/2005 | Reiderman | 324/333 |
| 2006/0005965 A1 | 1/2006 | Chouzenoux et al. | |
| 2007/0257673 A1 * | 11/2007 | Nakahara et al. | 324/315 |
| 2007/0257812 A1 * | 11/2007 | Lasater | E21B 47/12 |
| | | | 340/854.8 |
| 2009/0085701 A1 | 4/2009 | Veneruso et al. | |
| 2009/0166035 A1 * | 7/2009 | Almaguer | 166/254.1 |
| 2014/0239959 A1 * | 8/2014 | Clarkson | 324/338 |

\* cited by examiner

Fig. 9 ized fluids, produced hydrocarbons etc, and it is difficult to communicate signals e.g. both inside and outside a casing or production tubing while allowing the fluids to pass. A pressure leak from the annuli separating the tubing could saturate the ground formation, which is a potential dangerous situation. The saturation of the formation could make the well collapsing and loosing its barrier function.
TRANSMISSION SYSTEM FOR COMMUNICATION BETWEEN DOWNHOLE ELEMENTS This invention relates to a system for transmission system for transmitting signals between an inner and an outer unit separated by an annular pipe section wall, and especially for pipes inclusing annular spaces between pipe wall.

BACKGROUND OF THE INVENTION

During drilling operation and hydrocarbon production/injection from/to subsurface oil and gas wells it is important to monitor the downhole conditions, e.g. to detect leaks, temperature changes and flow conditions, in the pipes casings and areas surrounding the well. This is, however, complicated by the fact that the wells usually includes a number of coaxial pipes separated by annular spaces containing pressurized fluids, produced hydrocarbons etc, and it is difficult to communicate signals e.g. both inside and outside a casing or production tubing while allowing the fluids to pass. A pressure leak from the annuli separating the tubing could saturate the ground formation, which is a potential dangerous situation. The saturation of the formation could make the well collapsing and loosing its barrier function.

One known solution for obtaining this is the use of penetrators combined with antennas or coils for communicating across the annuli between the pipes, as described in WO2009/040510, U.S. Pat. No. 7,165,618 and U.S. Pat. No. 6,684,952, but in environments potentially involving pressure differences between the annuli between the tubes and casings this introduces a risk of failure. Also the inductive coupler portions, corresponding to windings, discussed in in U.S. Pat. No. 7,165,618 and U.S. Pat. No. 6,684,952 are not themselves sufficiently protected against the environment.

U.S. Pat. No. 7,170,424, U.S. Pat. No. 5,008,664, U.S. Pat. No. 4,852,648 and U.S. Pat. No. 3,550,682 discuss the possibility of communicating through the pipe wall using induction coils, and U.S. Pat. No. 5,008,664 discuss the challenge of inherently inefficient coupling between two induction coils coaxially arranged, separated by a metal pressure barrier. There is, however, a trade off between the requirements for power transmission efficiency, signal transmission capacity and efficient sealing in the volatile high pressure downhole environment. To a certain degree the poor coupling efficiency in U.S. Pat. No. 5,008,664 is compensated for by use of low power electronic in the downhole equipment/gauge. Although a higher efficiency can be obtained with a non-magnetic metal section, as described in a corresponding solution in U.S. Pat. No. 7,063,148 the coil sizing is short and the casing thickness too thin, 5-10 mm, to be useable for high pressure situations. Another solution is described in US2009/0085701, and to some degree in U.S. Pat. No. 7,170,424 and U.S. Pat. No. 4,901,069, where a PEEK material or similar is provided between the antennas but the pipe wall serving as a pressure barrier is not positioned between the antennas. The theory of controlling magnetic fields through barriers is also discussed in U.S. Pat. No. 6,628,118.

BRIEF SUMMARY OF THE INVENTION

Thus it is an object of this invention to provide a system for communicating and supplying power to downhole electronic equipment, partially isolated in different annuli in a well, while being able to withstand harsh environment, such as large pressure differences, high temperature, and/or chemically reactive environment as well as allowing fluid flow in the annuli. This is obtained by a system as described above and characterized in the accompanying claims.

According to the preferred embodiment of the invention it thus relates to a rotary transformer similar to the ones described in U.S. Pat. No. 7,063,148 and U.S. Pat. No. 5,008,664, being constructed by two axially aligned toroidal coils, magnetically coupled with two closely aligned, magnetic core halves.

According to the preferred embodiment of the present invention, the windings are hermetically isolated from each other, and surroundings, by individual, hermetic metal shields. Furthermore, the inner core has been replaced with a metal tube for passage of fluids and an annular passage of fluids in-between the windings is maintained, and thereby created a large gap. In addition, we have inserted a metal tube of substantial thickness as a high pressure barrier in-between the windings. In order to overcome the challenge of high power loss, and poor coupling, in such a perforated and handicapped rotary transformer design, the physical sizes and geometry has been investigated, and suited materials and how to combine these has been chosen as discussed below. Thus a frequency area in which the efficiency and coupling between the two coils has been found having a power transmission efficiency of 30% to 60% under the most severe conditions.

The invention will be primarily described in relation to downhole applications but may also be used in other industrial applications where wireless coupling of power and signals between downhole measurement equipment is required. Alternatively, or in addition, such a transformer can couple signals and power between pressure barriers within the downhole, fluid processing well. Other industrial applications can be surface process industry, aircraft, spacecraft, or robots, where signals and/or power need to be coupled between two parts which need to rotate in relation to each other.

Below several terms are used being related to downhole applications, where the "A-casing" is in this context a pressure barrier, the "A Annulus" is the annulus between the Production Tubing and A-Casing and the "B Annulus" is the annulus between the A-Casing and the B-Casing. An "Inner" component is a component located in the A-annulus, while an "Outer" component is located in the B-annulus.

"Tube" is similar to a "Pipe", only shorter, and "Tubing" is referred to as several "Tubes" or "Pipes" in a series. Terms like "coil" or "winding" are used in the ordinary understanding of the words in the technical field.

DESCRIPTION OF THE DRAWINGS

The invention will be described in detail below with reference to the drawings illustrating the invention by way of examples.

DETAILED DESCRIPTION OF THE INVENTION

Figure 1:
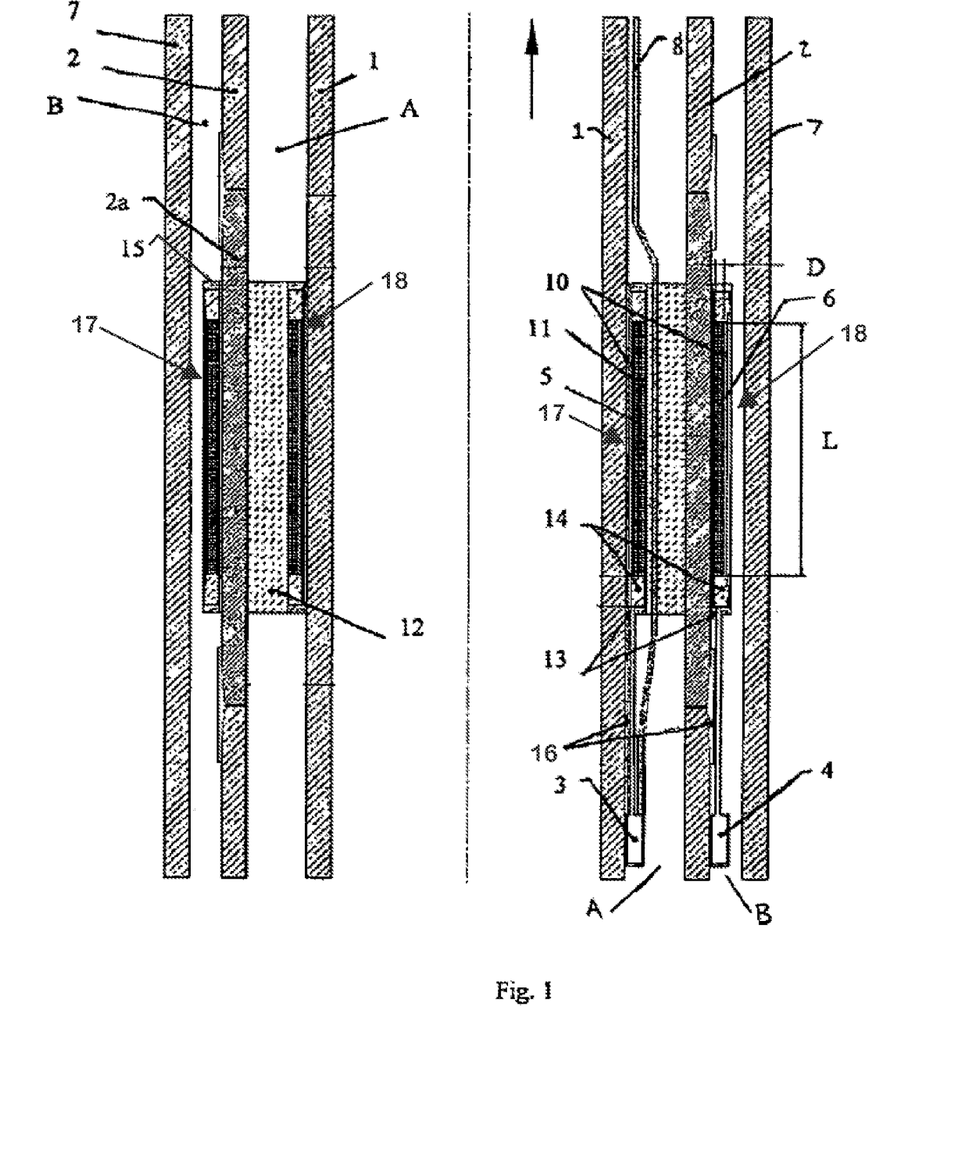
FIG. 1 illustrates an exploded view of a section of the system according to the invention.

In FIG. 1 the invention is mounted onto two coaxial pipes 1,2, e.g. the inner pipe 1 being a production tubing and the outer pipe 2, A casing. The annulus between pipe 1 and 2 is A annulus. The annulus between pipe 2 and 7 is the B annulus. Pipe 7 is commonly named B casing. A sensor 3 (e.g., sensor module, gauge) is positioned onto the production tubing, pipe 1, for measuring the conditions in the annular channel, Annulus A, and as is evident from the drawings a space 12, also called "air gap" is provided between the first 1 and second 2 pipes so as to let the fluid flow in the annulus through. The control unit can provide measurements in Annulus A.

A sensor 4 (e.g., sensor module, gauge) is positioned onto the outside surface of the A casing, pipe 2, so as to provide measurements of the condition outside the second pipe 2.

The sensors 3,4 may measure a number of different parameters in the annuli, but typically the temperature and pressure is measured. For communicating the measurements over the gap between the pipes, two antennas 17 and 18 constituted by coils 5, 6 are mounted respectively onto pipe 1 and onto pipe 2 at approximately the same axial position. Axial position offset between the coils can be tolerated up to the length of one coil. The antennas 17, 18 are adapted to transmit and receive signals as well as power across the annulus and through the outer pipe 2 (A-casing), and are according to a preferred embodiment of the invention constituted by coils 5, 6 extending along the outer circumference of the inner pipe 1 and along the outer circumference of the outer pipe 2.

In the drawings the communication with topside instrumentation and control systems is provided through signal leads 16 along the inner pipe 1, and the inner sensor 3 thus is powered and communicates directly through this. The sensor 4 positioned onto the outer pipe 2 obtains both communication and power through the coils 5 and 6. The power supply may be provided using a carrier signal in the range of 1 Hz-5 kHz which in the sensor 4 is rectified to provide a stable DC power supply.

The communication signals are filtered out from the carrier signal using standard modulation/demodulation technology, and transmission from the second gauge to the main communication link 8 is also provided through the same coils. Multiplexing etc may be provided by the first sensor 3 or in a separate unit, e.g. related to the splice/coupling (not shown) into the main communication lead 8.

The communication between the topside and downhole equipment may be through standard networks using TCP/IP, MODBUS, RS422 or 485 protocols that will allow the gauge data to be interpreted in any suitable software package. Alternatively, the communication can be through specially designed downhole networks, e.g. as described in international patent application WO2008069677. The topside equipment may be placed in the well head and has an interface to the network through a twisted pair shielded cable 8 which runs down the side of the production tubing 1 and fastened thereto in appropriate intervals along the production tube.

The instrumentation, sensor 3, mounted onto the first pipe that is measuring in annulus A comprises a standard gauge and connector or providing the chosen measurements and communicates according to the chosen protocols in the system, but it must be capable of supplying sufficient power to external electronics, which in this case involves the first coil. In addition there is a coupling to the first coil 5 and means for driving the coil so as to supply power and communicate with the second sensor 4 through the second coil 6.

The instrumentation, sensor 4, mounted onto the second pipe 2,2a that is measuring in Annulus B includes a standard gauge measuring for instance pressure and temperature, a transponder electronic module and an coil 6. The transponder electronic module included in this sensor 4, rectifies the carrier wave in order to power supply the sensor 4. In addition, the transponder electronic module transmits and receives the signal to and from the sensor 3 via the coils 5 and 6. In order to improve the signal transfer and power transmission efficiency between the coils through the material of the second pipe 2 at least the relevant section of the pipe 2a close to the coils is made from a material having a low magnetic permeability, preferably a metal. This will be discussed in detail below. Below the terms "Percentual Power Loss", and "Power Loss" in %, is in relation to total power supplied to the primary winding in the first coil.

Figure 2:
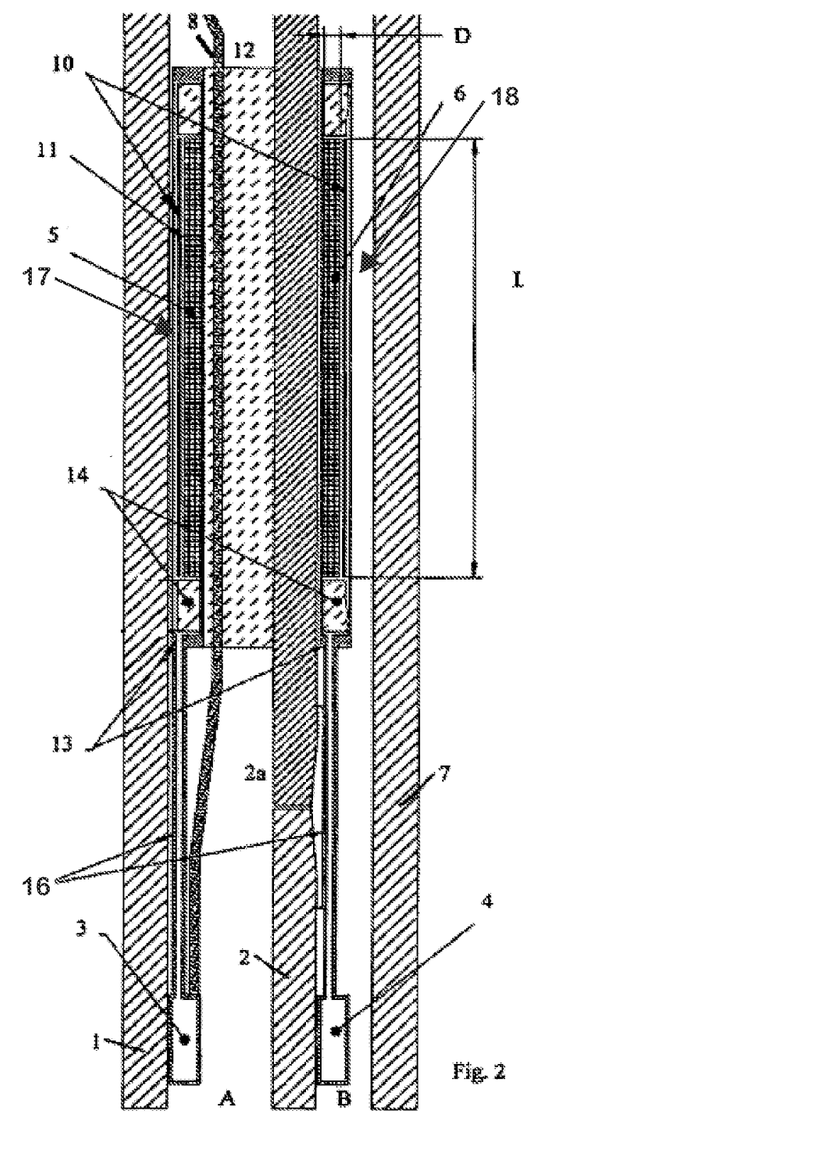
FIG. 2 illustrates a detail of the solution shown in FIG. 1 with the embedded coil/antenna according to a preferred embodiment of the invention.

According to the invention the coils are provided with a magnetic shield 10. The magnetic shield is a thin tube of soft magnetic material, (annular shaped, with relatively large diameter), preferably made of high magnetic permeability, and high saturation flux density material, for example made in a nickel alloy with the high permeability composed of 79% Ni-17% Fe, and 4% Mo. It is used to reduce Eddy current losses within the production tubing or the casing. Preferably one magnetic shield is placed inside the inner coil 5 and outside the outer coil 6, and flush with the windings 11 in the coils.

Preferably at least one bot preferably with the antennas/coils and comprised in transmission units comprising a hermetic shield 15 constituted by a complete metal cover of the windings. It may be combined with a magnetic shield and may also be referred to as a metal shield. This hermetic closing may be achieved by EB (Electron Beam) welding, the shield and windings may then be referred to as "Winding Assembly".

The signal and power transfer between the coils 5,6 may be regarded as a rotary transformer where the primary winding is the inner winding in the first coil 5, and the secondary winding is the outer winding, where power is transmitted from the primary to the secondary, and data signals are transmitted in both directions. However, the function and role of the Primary and Secondary Windings can be switched, e.g. if the signal transfer 8 to topside equipment is on the outer pipe, with almost the same performance in the Rotary Transformer. Practical tests, and FEA simulations in the physical sizing section confirms the mutual inductive coupling of the Windings, and thereby the necessary precondition for role switching of the primary and secondary Windings. The windings will not be discussed in detail here, but will according to a preferred embodiment of the invention be constituted by coils made with alternating layers of square magnet wire and polyimide sheet, shielded and protected by a housing such as a hermetic shield.

The metal in the pipe section 2a between the coils or windings 5,6 will preferably be a metal with relative magnetic permeability less than 10, preferably around 1. Examples of such materials may be Nickel-Iron alloys such as Inconel 718 with a composition of 53% Ni-19% Cr-17% Fe-3% Mo-5% Nb-1% Co-1% Ti.

In addition, the metal in pipe section 2a should have a low conductivity in order to reduce power loss in this section below a certain level. The practical limit runs around $\sigma(Fe) = 10.3$ MS but stainless steel 316 $\sigma=1.4$ MS and Inconel 625

σ=0.77 MS is preferred. This is connected to the required load impedance matching of the windings and will be described more in detail below.

The wire in the coils should on the other hand should have higher conductivity than 10.3 MS, for example metals like Copper, silver, aluminum, or gold.

Typical dimensions of production tubing and casings in downhole systems may be as follows:
Production tubing outer diameter: 5.5 inches or 7 inches
A-Casing outer diameters: 9.63 inches or 10.75 inches
A-casing thickness: 14 mm
B-casing outer diameter: 13.38 inches or 14 inches
Typical material of production tubing and casings
Production tubing, stainless steel 410 or 416: 13% Cr L-80,
A-casing: P110
B-casing: P110

Typical fluids or gas in the production tubing and in the annuli
Production tubing: oil & gas mixture with brine, sand, and other elements
A annulus: hydrocarbon gas or liquid, air, H2S gas, brine (salty water), water, and others gases or liquids.
B annulus: air, H2S gas, brine (salty water), water, cement, and others gases or liquids Pressure and temperature met in this downhole environment:
Pressure: up to 700 bars
Temperature: up to 250 Celsius degrees As indicated above the network interface module is placed in the A annulus and may be linked to a network of the type discussed in WO2008069677 to topside equipment. The Network Interface Module accomplishes the interface function between the topside equipment and the sensor. The network interface module power supplies the sensor 4, e.g., sensor module, by electromagnetic induction. The network interface module also demodulates the load modulated signal sent by the sensor 4 through the coil 6.

The sensor 4, e.g. sensor module, is placed in the B annulus for example to measure pressure and temperature. The sensor module sends the measure collected by load modulation to the topside system via the coils constituting the rotary transformer, the network interface module and the interface downhole network. The sensor module is power supplied by electromagnetic induction from the network interface module. The sensor module load modulates the electromagnetic wave carrier from the network interface module.

The inner coil 5 and the outer coil 6 in antennas 17, 18 respectively must be connected with wires respectively to the network interface module and to the sensor 4. As the environment for the winding assembly, the network interface module and the sensor module is a high pressure, high temperature and corrosive environment they are protected using a metal tube between the inner winding assembly and the outer winding assembly is placed respectively to the network interface module and to the sensor module. It is critical to have no fluid or gas in contact with the wires or the connections. This way short circuits between coils or modules terminals as well as short circuits between the coil terminals or the active Module that the coils are connected to are avoided.

As mentioned above the Hermetic Shield (the tube protecting the wires and their respective active modules) is preferably made from metal, ideally Nickel alloys and is adapted to seal the wires and terminals. Nickel alloys are well known in downhole applications to have a satisfying resistance to this corrosive environment for decade of years as well as being non-magnetic and having low conductivity.

In lift well systems the flow in the A and B annuli must be restricted as little as possible. It is therefore fundamental to build the Winding Assemblies as thin as possible. The choice of materials and their thickness is therefore critical.

In this situation the winding assembly has a thickness D being less than 8 mm. In its majority, the main thickness comes from the coil. The coil thickness owns a positive effect on power transmission efficiency of the winding assembly. The hermetic shield and the magnetic shield are chosen to be as thin as possible, preferably <1 mm for example 0.375 mm.

For easy sealing purposes between the parts, the hermetic shield and magnetic shields must be in metal, with thin metal sheets. Thin metal sheets are justified for electromagnetic purposes and to keep a good flow sections in the annuli.

Main requirements for choosing the magnetic shield 10 are:
the electromagnetic properties of the material used as a magnetic shield
the frequency band the magnetic shield is dedicated for
the thickness required to achieve the shielding function looked for
the resistance to shocks and vibrations versus the environments it will be confronted
the ductility of the material in the chosen configuration.
and finally, the temperature and pressure ranges the material can withstand versus operation The preferred material for downhole applications satisfying the requirements described above is the Mu Metal, being a group of soft magnetic, 80% Nickel Iron Molybdenum alloys. Actual brand names are Supermalloy, Superperm 80, HyMu80, MuMetal, Hypernom and 4-79 Permalloy.

Main requirements for choosing the hermetic shield are:
The hermetic shield must be in metal to make easy sealing solutions between the parts.
The hermetic shield must withstand to corrosive environment.
The hermetic shield must withstand to high temperature (up to 250° C.)
The hermetic shield must withstand to high pressure (up to 2000 Bar)
The hermetic shield should in the ideal case not affect the electromagnetic waves. It should be made of non-magnetic metal and a have a low electric conductivity.

Like it can be seen in the drawing, the hermetic shield 15, 10 is thicker at its extremities 13. This is made for mechanical strength purposes. In order to avoid weakening the electromagnetic field by crossing these thick metal sections, a free space is added, inside the Winding Assembly, at each extremity of the coil. This free space can be filled with an electric insulator 14. This free space is required to allow the magnetic field crossing, in its majority, the tubular sheet of the Hermetic Shield instead of the thick steel extremities of the Hermetic Shield.

The electrical insulators 14, e.g. rings, are in a material with a low thermal expansion, low magnetic permeability, low electric conductivity and withstand high temperature over a long time, for example made from PEEK® or Torlon®. It is advantageous to have a free space 13 between the coil extremities and the thick extremities of the Hermetic Shield. This distance must be higher than 5 mm to avoid losing too much power at winding edges, 20 mm is preferred.

In the inner winding assembly, the magnetic shield 10 is mounted on the coil former. Then the winding 11 is made on top of the magnetic shield with a suitable layer of electrical insulation (polyimide film). Thereafter the all construction is impregnated with a suitable impregnant lacquer (Epoxy or silicone). Thereafter the outer part of this Hermetic shield is EB welded on the end lids.

Making the outer winding Assembly, the same method is used, except that the magnetic shield 10 is mounted outside the winding instead.

For constructing the coils, the following requirements apply:

Magnet wire: To compensate the thin Winding Assembly requirement the magnet wire conductivity must be as high as possible, silver, copper, gold or similar materials. In addition, to improve the coil conductivity, a square section wire is preferred. Furthermore, coil made with layers of square magnet wires will spread uniformly pressure load between layers.

Magnet wire insulator: The magnet wire must have a good insulator around withstanding to high temperature up to 250° C., e.g. using a polyimide like Kapton®.

Polyimide layers: To make the coil more reliable, it is advantageous to put thin tubular polyimide sheets between the winding layers. It spreads the pressure load and it avoids direct contact between magnet wires from one layer to another layer. Otherwise the friction phenomenon happening when there is a fast gradient during thermal expansion and pressure load variation, damages on the long term, the magnet wire insulator between layers.

Impregnating resin: To better electrically insulate and reinforce the structure the coil should be impregnated with Epoxy resin or Silicone resin or other suitable material to keep a good cohesion of the coil.

The A-casing located close to the winding assemblies must have the following properties:

for electromagnetic purposes, a low relative magnetic permeability (lower than 100, ideally 1)

for electromagnetic purposes, a low electric conductivity (lower than $10.3*10^6$, ideally an insulator)

for mechanical strength purposes, the properties must be compatible to withstand traction, compression and torque met in a lift well. The substitute material must have equal or better mechanical properties than P110 material.

for corrosion purposes. The chemical properties of the material must withstand to corrosive environment like downhole environment.

As mentioned above one example of an adequate material identified for satisfying these requirements is Nickel alloys.

The B-casing is in proximity of the outer winding assembly and coil 6. Power loss in B Casing is reduced if permeability of the magnetic shield used in this winding assembly is much higher than the magnetic permeability of the casing. A ratio of 10 should be minimum.

Figure 5A:
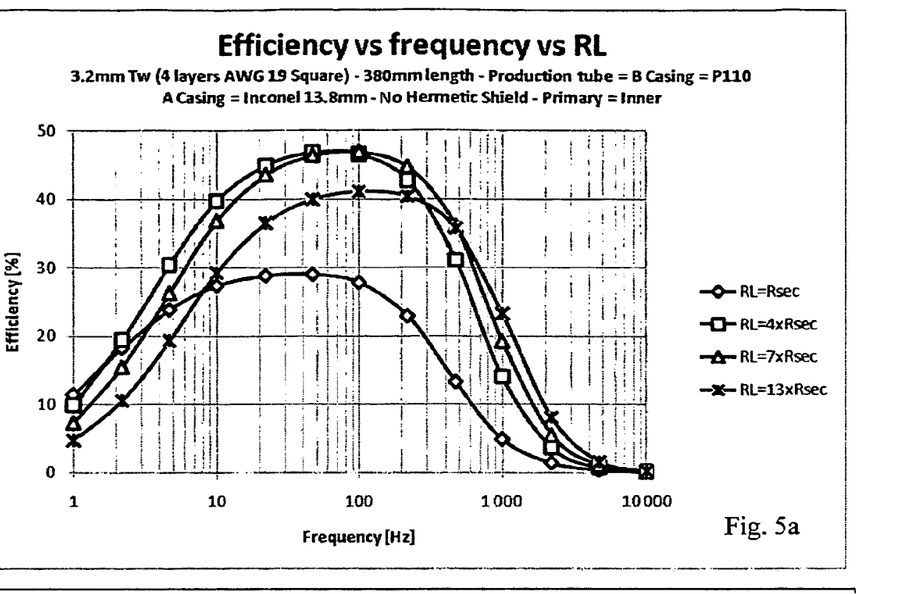
FIGS. 5a-c illustrate efficiency vs frequency in different embodiments of the invention.
Figure 5B:
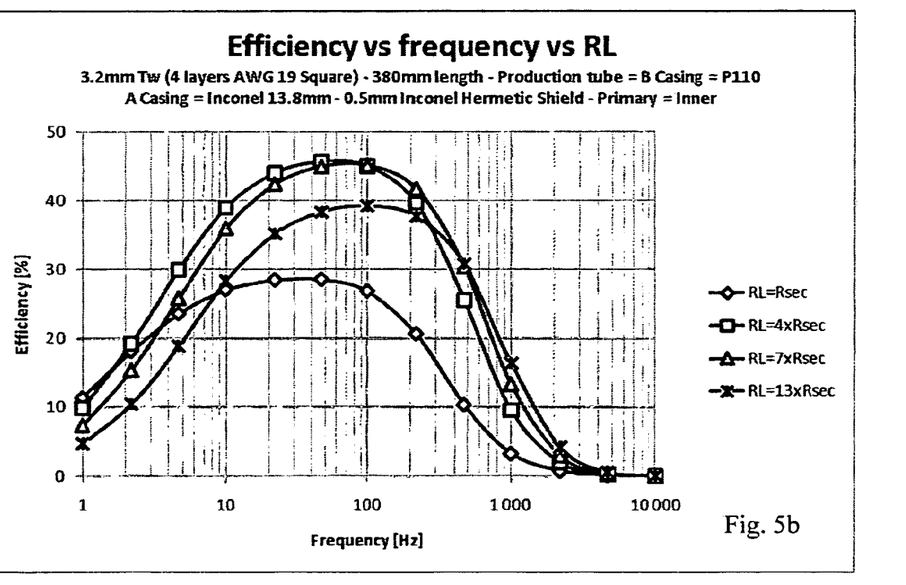

Preferred Physical Sizing of the Coil to Achieve High Efficiency and High Bandwidth To get the advantages of a "Hermetic Shield", high magnetic coupling and low ambient loss is a required starting point for the coils. Compared to non-metallic (non-conducting plastic or polymer), a Metal Shield gives a significant Power Loss, and typically destructive Power Loss in a Rotary Transformer like this. However, since this invention already requires means to overcome the loss in an internal pressure barrier of metal, we have further investigated the possibility of adding metal shields. By using the same type of material in this shield, as in the pressure barrier (Casing), and by making it thin (<1 mm), we have ended up with a quite low and acceptable level of Power Loss, of 5-10%. FIG. 5a illustrates the efficiency without the shield vs frequency and load, while FIG. 5b illustrates the same with shield. As can be seen from the graphs, 2% to 8% reduction du to Magnetic Shield in the 100 Hz to 1 kHz frequency range.

After accepting some loss in the Hermetic Shield, we then continue to compensate as much as we can for this loss by reducing all other loss in the Rotary Transformer to a minimum. In that way, we actually end up with a quite efficient Rotary Transformer, for use when "a passage of fluids at high pressure and high temperature in a corrosive environment is needed". This is contrary to statements in U.S. Pat. No. 5,008,664, U.S. Pat. No. 6,628,118 B1, which talk about poor efficiency in such coupled coils (from before).

To achieve high efficiency is in general important to get as much as possible of available power, transferred to the sensor. In particular this is important when available power is limited, such as in a downhole instrumentation network, and/or in cases when several rotary transformers are to be connected in cascade. Furthermore, high efficiency results in a higher signal to noise ratio on data signals, and simplify modulation/demodulation circuitry.

Good coupling between coils opens for the possibility of load modulation of (data) signal, in comparison to more advanced and complicated techniques, such as modulating a carrier, which must be utilized in poor coupling designs.

For the passage of fluids or gas, the (air/gas/fluid) gap between metal tubes must be as wide as possible. Therefore, thin coil assemblies are needed. This means that outer environmental shield, magnetic shield, and coils, must be formed as thin tubes, annular in shape. This form is therefore given due to other requirements than the overall Rotary Transformer efficiency. However, as further detailed in the section discussing materials selection, proper materials can be found, to minimize the negative effect of such a form, with respect to efficiency and frequency range (bandwidth).

The general challenge of a large air gap between coils is described in further detail in "Underwater Technology—Vol 12, issue 3". The article "Inductive Couplers in Underwater Power Distribution Networks—Improving their Applicability", states that a 0.05 mm gap has the same resistance to magnetic field as a 250 mm length of core material. In this article, configurations with air-gaps of more than 0.25 mm are therefore not investigated. Our air-gap is at least several millimeters in a gas/fluid, combined with the magnetic "air-gap" in the metal barrier (typically >10 mm).

Inspired by the suggestion in the above article, to "increase the cross-section of the air gap between core halves, by elongating the core gap, in order to increase the magnetic coupling through the air", we have made the coils longer. In this case, even if we don't have two core halves facing each other, as in the above article, we nevertheless increase the cross-section of the air-gap between the two coils, where the flux will pass.

Figure 3A:
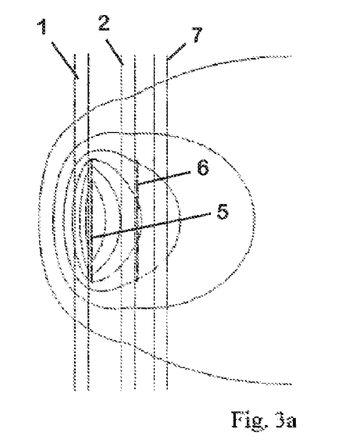
FIGS. 3a-d illustrate the magnetic fields and couplings between coaxial coils.
Figure 3B:
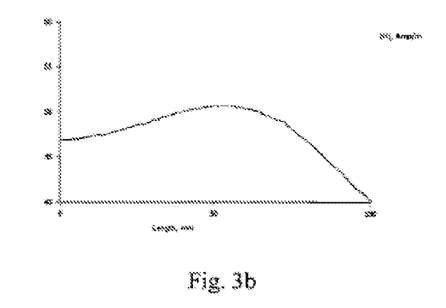
Figure 3C:
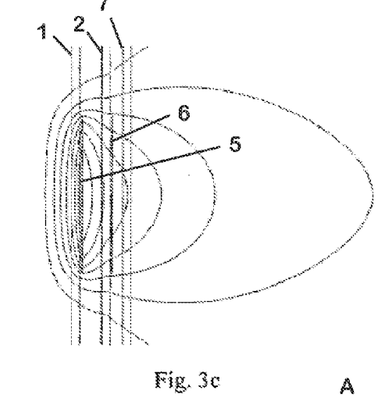
Figure 3D:
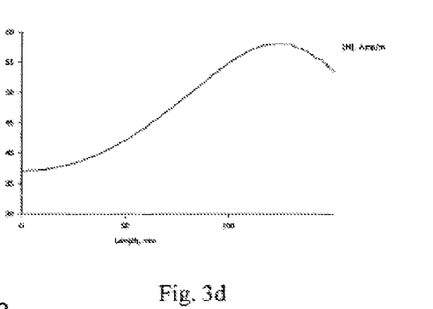

FIGS. 3a,3b,3c,3d show EM-FEA (ElectroMagnetic-Finite Element Analyze) of two different coil length configurations 130 mm and 258 mm, and corresponding field strength at secondary winding. FIG. 3a shown Contour flux lines, Iprim=1A, f=100 Hz, Np=Ns=64 t, Wd=1.8 mm, H=50 A/m, B=0.063 mT and FIG. 3b shows Magnetic field strength along secondary winding, from center, to −100 mm (winding stops at −65 mm)−Hpeak=50 A/m for 130 mm coil length. FIG. 3c shows Contour flux lines. Iprim=1A, f=100 Hz, Np=Ns=128 t, Wd=1.8 mm, Hs=58 A/m, Bs=0.073 mT and FIG. 3d shows Magnetic field strength along secondary winding, from center, to 150 mm (winding stops at 129 mm)−Hpeak=58 A/m for 258 mm coil lengths.

In these two examples, the primary current, wire thickness and frequency is the same. Tube sizes and diametrical difference (Wdd) of the coils is also the same. Wdd=95 mm in this example. By comparing the EM FEA analyzes of these two lengths, we can see that a longer coil results in higher magnetic field strength at secondary winding. However, we should take into consideration that the driving force N*I, is twice as high in this last example. "N" is number of turns, and "I" is the current.

According to Ampere's law, the expression for magnetic field strength in (and around) a single coil is:

$$H = \frac{NI}{l_s}$$

Here, $l_e$ is the effective magnetic length, which is the average length of the flux path (lines). From this equation, we can see that a longer coil, and thereby a longer $l_e$, reduce the magnetic field strength accordingly. This effect contradicts some of the positive effect of making the coil longer. Fortunately, there is a solution to this problem, as described in further detail in the Magnetic Shield section. Furthermore, we should remember that the integral of the flux in the secondary winding is now much higher. Therefore, the preliminary result of this attempt to increase the cross section of the Air Gap, is quite uplifting.

Figure 5C:
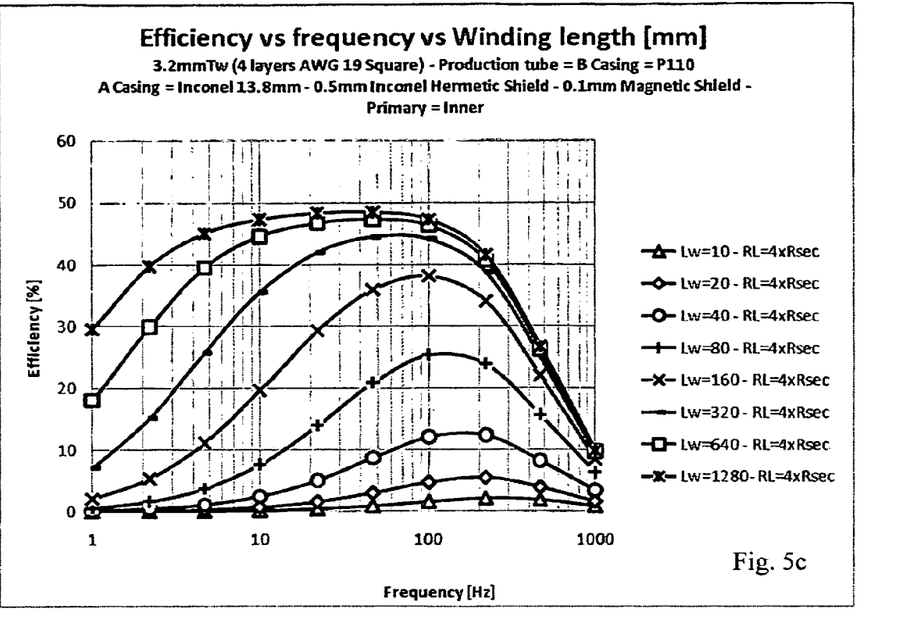
Figure 5D:
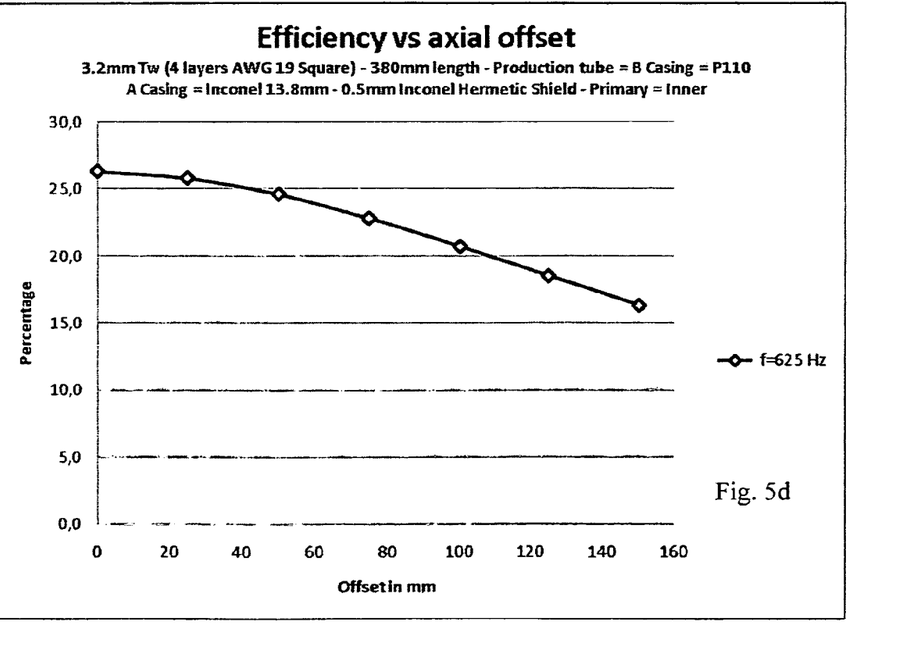
FIG. 5d illustrate the efficiency vs the axial offset.

If we compare the ratio between winding length (L), and Wdd in these two examples, we get ratios (Rlw) of: Rlw=L/Wdd=1.37 for the short coil, and Rlw=L/Wdd=2.76 for the long coil. Although a ratio of 1 will give certain efficiency, we recommend a ratio of at least 3, for a high efficiency design. FIG. 5c illustrates the transmission efficiency for various lengths L.

Another benefit of choosing a high Rlw is in case of axial misalignment of the coils, in the z-direction. In a practical installation in a remote sub-sea, or oil-well installation, where each coil is positioned independently, there is a high chance that the two coils will not be perfectly aligned. In this connection, we have via EM FEA simulations and real tests discovered that the electromagnetic coupling efficiency between coils is less affected by axial misalignment when the coils are long. For example, coils with a length of 380 m, and with the same diameter as above, show high efficiency even with a misalignment of 100 mm, see the graph illustrated in FIG. 5e.

Figure 4:
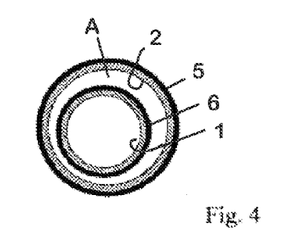
FIG. 4 illustrate a cross section of two coaxial pipes having a radial offset.

In addition to axial misalignment, there is also a high chance of radial misalignment. However, practical tests show little sensitivity to this kind. The reason for this is probably that the negative effect (increase of air gap) of misalignment on one side, is compensated for by an opposite, positive effect on the other side (decrease of air-gap). The following illustration shows an example of radial misalignment as indicated in FIG. 4.

Main reason why we need high bandwidth is to ensure sufficient response time and resolution on measurements/data within a practical time period, especially when a number of parameters is to be transmitted. A high bandwidth also enhances the power transmission. Then, smaller sized inductors and capacitors can be used in the necessary interface/driver circuits, in the limited room is available. Furthermore, when capacitor sizes are reduced, higher quality dielectric can be utilized, which is more stable with temperature variations, and show extended lifetime before failure.

Upper frequency limit of the Rotary Transformer is limited by the internal pressure barrier of metal. It is the thickness of this pressure barrier, together with its electrical and magnetic properties which gives the actual limit. A direct expression of the upper frequency limit is guided by the common known skin depth equation:

$$\delta = \sqrt{\frac{2\rho}{2\pi f \mu_R \mu_0}} \text{ (meters)}$$

$\rho$ = resistivity (ohm-meters)

$f$ = frequency (Hz)

$\mu_0 = 4\pi \times 10^{-7}$ (Henries/meter)

$\mu_r$ = relative permeability of the metal.

The skin depth is defined [in Wikipedia] as the depth below the surface of the conductor at which the current density decays to 1/e (about 0.37) of the strength at the surface. This means that if the thickness of the pressure barrier is larger than the skin depth, at a given frequency, then only a small fraction of the electromagnetic signal from the primary coil reach through to the secondary coil.

In our example, with a pressure barrier made in Inconel 718, the resistivity, $\rho$=1.25 µS, $\mu_r$=1.0011, and power transmission frequency f=625 Hz. This gives a skin depth of 22.5 mm. Thickness of the pressure barrier is 13.8 mm, which is 0.61 times the skin depth. At 1.66 kHz, the skin depth is equal to the thickness of the pressure barrier in our example. The graph illustrated in FIG. 5b shows an FEA simulation of efficiency versus frequency from 1 Hz to 10 kHz.

The graph in FIG. 5b shows how efficiency is affected by various load resistances. Thus, load resistance must be selected according to frequency. "Rsec" is the DC resistance of the Outer winding. As illustrated by the graph, load resistance must be in the range RL=2×Rsec to RL=13×Rsec in this example. All FEA analyses done so far in other variations, also confirm this range.

Furthermore, this graph is intended to show the general damping through a metal casing, and not the real performance of our system at 625 Hz. At this frequency, it is possible to tune the primary driver impedance to increase the power factor, and secondary load impedance to the complex conjugate, to compensate for the leakage inductance. This tuning, combined with using an optimum load resistance is similar to the capacitance tuning mentioned in the above mentioned article: "Inductive Couplers in Underwater Power Distribution Networks—Improving their Applicability".

In relation to the bandwidth of our system, there is a compromise between power carrier efficiency and baud rate. In order to simplify the modulation/demodulation circuit, we use synchronous load modulation of the power carrier. In this way, due to high coupling efficiency, it is possible to demodulate the data signal without a preamplifier. In an alternative embodiment of the invention, a more advanced signal/data modulation can be used, where a separate signal carrier is used, and thereby the power transmission frequency is less dependent on the power transmission frequency. Since the demand for high efficiency is less in the data transmission, compared to the power transmission, this alternative signal carrier can be much higher in frequency, and thereby allow for a higher baud rate than a synchronous load modulation will give. Different practical variants of this method are explained in large detail in U.S. Pat. No. 5,008,664.

The thickness of each Winding, combined with the conductance of the Magnet Wire, affect the combined conductivity of all turns in the Winding. Conductivity ($\sigma$-Copper) of Magnet Wire, multiplied with Winding thickness, D, should be equal, or larger than Conductivity of A Casing material ($\sigma$-Inconel) times thickness of A Casing. When this precondition is obtained, then high efficiency of the power transfer through the Rotary Transformer can be achieved by selecting a load within the range of: the impedance matching resistance of the transformer (lowest value), and the equivalent internal load resistance of the A casing (highest value).

In addition to the above mentioned sizing and frequency range, it should be mentioned that the following parameters also affect the efficiency of the Rotary Transformer.

Shape of wire should be square, or rectangular, in order to increase the (copper) fill factor in the coil. This also helps to increase the conductivity of the coil.

Number of turns should be high enough such that the magnetizing current of the primary winding is less than the current of the power transmission carrier Number of layers should for practical reasons be an even number, and adjusted such that number of turns matches the desired thickness.

Inner coil, when supported by the inner production tube, should be placed as close to this as possible, to maximize the annular passage for fluids or gas outside the coil.

Outer coil should in any case be placed as close as possible to the outside of the A Casing.

This placement described in this last bullet reduces the distance between coils, and also enhances the magnetic coupling between A Casing and outside coil. EM FEA analyze show that the A casing acts as a transit device for the electromagnetic wave. Therefore, the overall coupling through the gap between coils is enhanced if one of the coils has a close coupling to this transit.

Neither of the prior art U.S. Pat. No. 4,852,648, U.S. Pat. No. 5,008,664, U.S. Pat. No. 7,063,148 B2 and U.S. Pat. No. 7,170,424 suggestions are given with respect to: optimum range of load impedance, shape of wire, material in wire, winding thickness, winding length, number of turns, number of layers, or optimum placement of windings (with respect to surrounding tubes). U.S. Pat. No. 7,063,148 B2 mentions that coil length should be 1 to 30 mm, but this would have given poor performance in the present application, for several reasons, as outlined above. Also, no comments are given on the problematic of axial- or radial misalignment of coils. In practical installations of the separate parts of a the Rotary Transformer, in sub-sea, or other remote locations, there is a significant challenge of aligning the two Winding Assemblies properly, especially if several Rotary Transformers are to be installed simultaneously, at multiple pick-off points, supported by the same tubing.

An important aspect of the present invention is the use of a magnetic shield. One motivation for this is to avoid eddy current loss, and hysteresis loss in the production tube. This is particularly important if the production tube is in P110 material, or other magnetic steel. By inserting a tubular magnetic shield between the production tube, and the inner coil, the magnetic flux will be collected in, and follow the magnetic shield, instead of penetrating into the surface of the production tube. When this is said, there will be some loss at coil edges, but this is not significant, and can be tolerated.

In the same way as with the inner Magnetic Shield, an outer Magnetic Shield, inserted between the outer coil and the B Casing, will remove most of the eddy current loss in the B Casing.

Figure 6A:
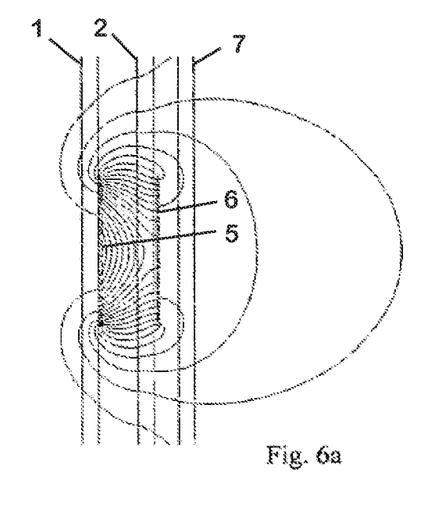
FIG. 6a,b illustrate the magnetic fields and couplings between coaxial coils, with short coils.
Figure 6B:
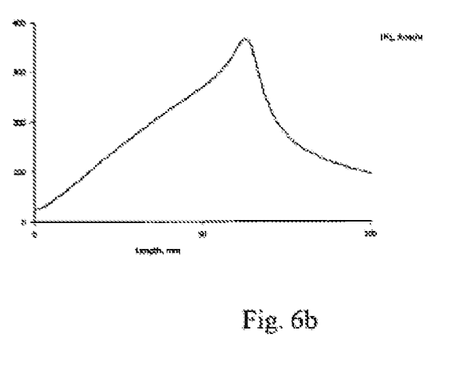

According to the present invention the use of Magnetic Shields, combined with proper sizing of coils, can more or less compensate for the loss in a large Air Gap, and the A Casing. In addition to avoid loss in the production tube, and (B-casing) magnetic shields makes it possible to extend the length of the winding, due to good magnetic conduction along the winding, and thereby reducing the effect of the air-gap. The EM FEA simulation in FIGS. 6a and 6b illustrates this with relatively short coils, where FIG. 6a shows Contour flux lines. Iprim=1A, f=100 Hz, Np=Ns=64 t, Wd=1.8 mm, Hpeak=365 A/m, Bpeak=0.45 mT and FIG. 6b shows Magnetic field strength along secondary winding, from center, to 100 mm (winding stops at −65 mm)–Hpeak=365 A/m, both with a coil length being 130 mm.

Compared to the EM FEA analyze in FIG. 3a-3d, the magnetic field strength has now increased from 50 A/m to 365 A/m. Corresponding flux density has increased from 0.063 mT to 0.45 mT. We can clearly see that the flux is more intense, and guided/collected by the magnetic shields. The following Ampere's law show how the magnetic field strength, and corresponding flux, is shared by the magnetic shield, and the Air Gap.

$$NI = H_{Shield} L_{Shield} + H_{Air\ Gap} L_{Air\ Gap}$$

$$NI = B \frac{L_{Shield}}{u_{Shield}} + B \frac{L_{Air\ Gap}}{u_{Air\ Gap}}$$

$$u_{Air\ Gap} = u_s = 4\pi \times 10^{-7}$$

"N" is number of turns, and "I" is the current in the coil (Iprim). By relating these equations to each other, we can see that if the μShield becomes much larger than μ0, then the first term on the right side becomes insignificant, and the term associated with the Air Gap dominates. This is a common known effect of Air Gaps in similar magnetic circuits, where the coil is wound on a regular magnetic core. The expression for magnetic field strength is then reduced to:

$$H = \frac{NI}{l_s}$$

Figure 7A:
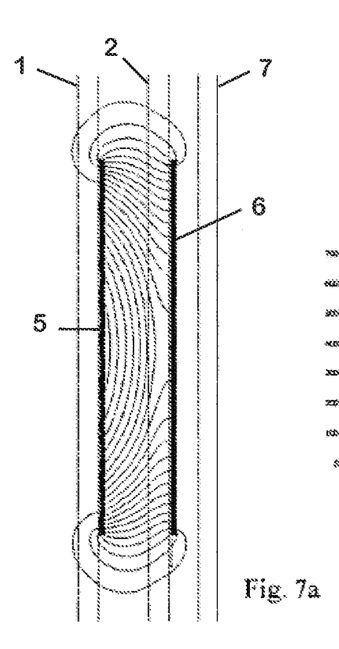
FIG. 7a,b illustrate the magnetic fields and couplings between coaxial coils with long coils.
Figure 7B:
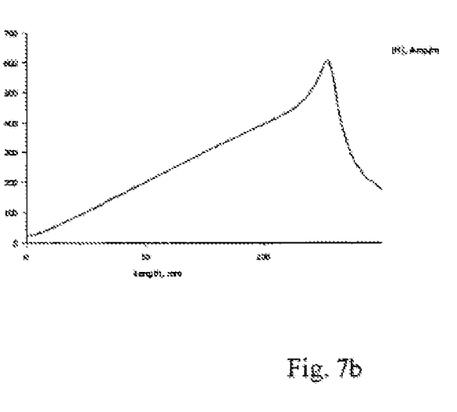

Here, le is the effective magnetic length, which is very close to the size of the Air Gap. Since the Air Gap is only a fraction of the total magnetic length, we end up with an increase in the magnetic field strength of 7.3 times in this example. This indicates that we should achieve an even higher increase in field strength in a longer winding, as is illustrated in FIGS. 7a and 7b, where FIG. 7a shows Contour flux lines. Iprim=1 A, f=100 Hz, Np=Ns=128 t, Wd=1.8 mm, Hs=600 A/m, Bs=0.78 mT and FIG. 7b shows the Magnetic field strength along secondary winding, from center, to 150 mm (winding stops at 129 mm)–Hpeak=600 A/m, both with a coil length of 258 mm.

In this example, the magnetic field strength is 600 A/m, and has increased 10.3 times compared to the one without Magnetic Shield. This is indeed more than the 7.3 times we got with the shorter coil. Corresponding flux has increased from 0.073 mT to 0.78 mT, which is a 10.7 times increase, and also a higher ratio than in the shorter coil. Furthermore, we can see now that the magnetic flux is even more confined within the Air Gap, and in-between the two coils.

The last example proves that Magnetic Shields together can act like a magnetic coupling device from one coil to the other, even when a large Air Gap, and thick metal barrier (A Casing) is present. In a long coil, electric field strength and corresponding flux is increased more than ten times, and the cross-section of the air-gap is significantly increased.

The use of magnetic cores to enhance performance of coils is generally a well known fact. However, such a magnetic "core" is not obvious in this application, simply because there is no room for it. Here, the inner production tubing occupy the regular room for an inner core, and the Air Gap and A Casing occupy the rest of the room between the Winding Assemblies.

Figure 8:
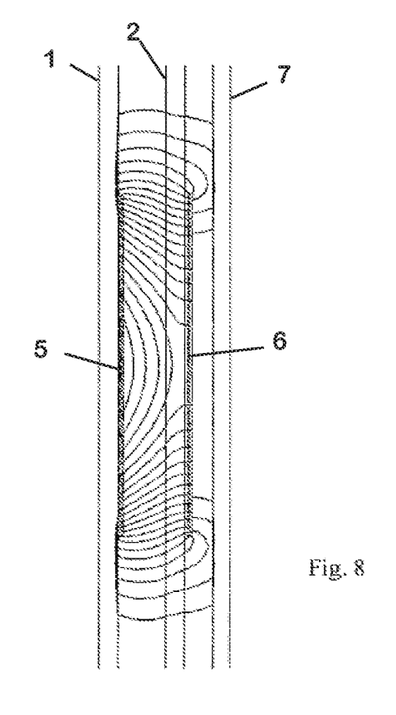
FIG. 8 illustrate the magnetic field with a magnetic shield.

Further EM FEA runs illustrated in FIG. 8 show that there is nothing to gain by extending the Magnetic Shield above the length of the coil. The reason for this is that we gain more by extending the coil with the same length, than we loose in eddy current loss at winding edges. Therefore, a general rule is to keep approximately the same length of coil and Magnetic Shield, and to align them axially. The following EM FEA output shows how some of the magnetic flux is trapped and guided by the inner Production Tube, and B Casing, at when these are made of magnetic metal, such as P110. This analyze of the edge effect of the Winding Assembly has been made at 50 Hz.

Even though eddy current loss in such a poor magnetic conductor is significant, EM FEA runs show that only a small part of the flux at Winding edges transit through these tubes. Fortunately, this proves to be especially true in the high frequency range, where the eddy current loss is usually highest. In addition to this reduced effect of eddy current loss at edges, there is actually also a benefit from the magnetic property of the surrounding tubes. When this is said, the A casing must of course be non-magnetic for transmission of frequencies above 1 Hz (referring to skin effect equation). This makes the A Casing almost completely transparent to frequencies up to about 500 Hz. The transparency and low distortion of the magnetic in the A casing is illustrated quite well by the contour flux lines above, as well as the collecting and guiding of the flux by the inside- and outside tubes. The positive effect from this guiding comes from the increased coupling of flux between the coils. Then, less flux runs just from one end to the other end of the same coil, through the Air Gap. This effect is commonly known as the transformer leakage flux. A further discussion of possible use of Production Tubing, and B Casing as "magnetic cores" is further detailed in the "Alternative Magnetic Couplers" section below.

Magnetic material of different types can be used in the Magnetic Shield, as long as the material has high relative permeability ($\mu r > 2000$), to compensate for the relative thin shape, and thereby the low cross-section, Ae. Both low-conductive, and high-conductive Ferrites can be used, as well as magnetic metals, like Nickel-Iron alloys and Silicon-Iron alloys. Ferrites are difficult to produce in the required form, with sufficient precision, and are also very brittle. Amorphous metals can also be used, although these, together with ferrites have lower curie temperature and poorer (life-time) performance at high temperatures. High Permeability, soft magnetic 80% Nickel Iron Molybdenum alloys, give the best combined properties for this shield. Actual brand names are Supermalloy, Superperm 80, HyMu80, MuMetal, Hypernom and 4-79 Permalloy.

MuMetal show many advantages such as:
extremelyhighmagneticpermeability
highsaturationfluxdensity
high curie temperature
long term stability at high temperature
lowvariationwithtemperature
robustness/ductility (can not crack like ferrite rods)
low eddy current loss when using thin shield in our frequency range
low hysteresis loss in our frequency range In connection to the Rotary Transformer efficiency, MuMetal shows a winning combination of slim construction, high flux density, high permeability, and low loss in the frequency range we use.

When MuMetal is selected, each layer should be thin (<0.2 mm), in order to reduce eddy current loss as much as possible. In case of high magnetic flux in the Rotary Transformer, several layers insulated with polyimide or other suitable polymer material can be used, in order to avoid magnetic saturation.

Due to the extreme permeability of MuMetal, special attention must be paid in order to not saturate the material by a small DC current running in Windings. A common known method to stabilize and limit the DC magnetizing flux in the MuMetal cores/shields, is to add an Air Gap in the magnetic path. Fortunately, in this invention, we already have a large Air Gap between the two Magnetic Shields. Therefore, the DC magnetizing problem is completely solved.

Alternative Magnetic Couplers

In cases where we can tolerate some eddy current loss in the Inner Production Tubing, this tubing can actually give the same magnetic guiding and coupling property as the Inner Magnetic Shield. It must then be made of magnetic metal, or magnetic composite (plastic) material (non-conducting material).

Although there is in general a significant disadvantage of using the Production Tubing as a magnetic core in this way, because of high eddy current loss, and hysteresis loss, there is a lower frequency limit where the advantage of the magnetic properties are larger than the disadvantage of the conducting properties. This border frequency will depend on the electromagnetic properties of the material in the tubing, Via EM FEA analyze of typical downhole materials, we have found a typical border frequency of 50 Hz.

In line with the above opportunity of using the Production Tubing as a substitute for the Inner Magnetic Shield, the B Casing can similarly be a substitute for the Outer Magnetic Shield if this has sufficient magnetic properties.

In both cases, the magnetic permeability of these tubes doesn't need to be high, since the tubes in themselves are relatively thick, compared to the Magnetic Shield. FEA runs show that a permeability of 100 is sufficient, as is the case with the P110 material, however Stainless Steel, 430, with a permeability of 409, show better performance. The latter is probably due to lower conductivity, rather than higher permeability.

Figure 9:
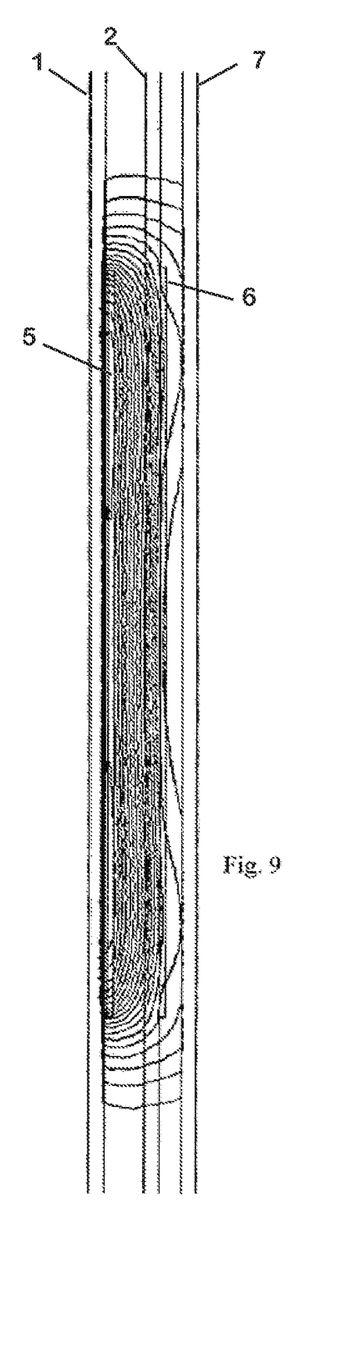
FIG. 9 illustrate the magnetic field with a magnetic shield according to another embodiment of the invention.

FIG. 9 shows a contour plot of flux lines from an EM FEA run at 20 Hz, with magnetic Production Tubing, and magnetic B Casing (P110).

Length of Winding is 680 mm, and thickness is 5 mm. Number of turns is 5000, and Load resistance is three times larger than the resistance of the Outer Winding.

To investigate the effect of the material in Production Tubing, and B Casing, three different EM FEA simulations was carried out. An AC current of 0.1 A was run in the Inner Winding, and thereafter the resulting input power, and usable output power, was calculated. The results are listed below:

Inconel 718 in Production Tubing and B Casing
Pin=547 mW, Pload=85 mW, $\eta$=15.6%
P110 in Production Tubing and B Casing
Pin=1500 mW, Pload=488 mW, $\eta$=32.5%
Stainless Steel 430 in Production Tubing and B Casing
Pin=1915 mW, Pload=856 mW, $\eta$=44.8%

From this, we can clearly see the benefit of using magnetic material in other tubing than the A Casing, at low frequencies.

The reason why the input power is not constant in these three examples, is that the reactance of the Inner primary winding increase proportionally to the magnetic properties in the Production Tubing. This can be seen from the increased input power, at constant current. This effect is also beneficial with respect to reduce the magnetizing current of the primary winding, when driving with constant voltage. In that case, a larger portion of the input current is transferred through the Rotary Transformer, as already mentioned above.

This alternative solution of using magnetic tubing in other than the A Casing, has not been mentioned in Prior Art. This is a simple and sufficiently effective solution to "Magnetic Shields" at frequencies below 100 Hz.

The invention claimed is:

1. A transmission system for transmitting signals, the transmission system comprising:
   an inner unit comprising a first antenna, the inner unit being essentially concentric around a pipe for carrying fluids;
   an outer unit comprising a second antenna, the outer unit being separated from the inner unit in a radial direction by an annular pipe section that provides a pressure barrier between an inside and an outside of said annular pipe section and an annular gap that contains a fluid;
   wherein the first antenna and the second antenna are brought into essentially the same axial positions along said annular pipe section;
   wherein said annular pipe section is made from a material having low magnetic permeability; and
   wherein at least one antenna of the first antenna and the second antenna is provided with a magnetic shield having high magnetic permeability, the at least one antenna being positioned between the annular pipe section and the magnetic shield and the magnetic shield extending along an axial length of the at least one antenna.

2. The transmission system according to claim 1, wherein the first antenna and the second antenna are constituted by conductive coils the axis of which conductive coils being essentially coaxial with the annular pipe section.

3. The transmission system according to claim 1, wherein an annular channel is positioned between at least one of the first antenna and the second antenna and the annular pipe section.

4. The transmission system according to claim 1, wherein the magnetic shield is included in a hermetic sealing enclosing the at least one antenna.

5. The transmission system according to claim 1, wherein both of the first antenna and the second antenna are provided with magnetic shields.

6. The transmission system according to claim 1, wherein the first antenna and the second antenna are operated in a frequency range of 1 Hz-5 kHz.

7. The transmission system according to claim 6, wherein the first antenna and the second antenna are operated in a frequency range of less than 1 kHz.

8. The transmission system according to claim 1, wherein a first unit of the inner unit and the outer unit comprises a coupling to an external power supply and a second unit of the inner unit and the outer unit comprises a sensor coupled thereto, the first antenna being adapted to transmit power to the second antenna.

9. The transmission system according to claim 8, wherein the sensor is powered through said transmitted power, the sensor and corresponding antenna also being adapted to transmit signals to the antenna in said first unit.

10. The transmission system according to claim 1, wherein a first unit of the inner unit and the outer unit comprises a coupling to a signal transmission line and a second unit of the inner unit and the outer unit comprises a sensor coupled thereto, the transmission system thus being adapted to transmit signals between said signal transmission line and said sensor through the first antenna and the second antenna.

11. A transmission unit for use in a transmission system, the transmission unit comprising:
    at least one unit of an inner unit and an outer unit, the inner unit and the outer unit being separated by an annular pipe section wall; and
    wherein an antenna is placed in said at least one unit, the at least one unit comprising a hermetic shield constituted by a complete metal cover of windings; and an inner pipe extending coaxially inside of the annular pipe section wall, the inner pipe to pass fluid therethrough, wherein the inner unit is mounted circumferentially around the inner pipe.

12. The transmission unit according to claim 11, wherein the hermetic shield is made from a Nickel alloy.

13. The transmission unit according to claim 11, wherein the hermetic shield is made from a metal foil having a thickness less than 1 mm.

14. The transmission unit according to claim 11, wherein the hermetic shield comprises a magnetic shield having high magnetic permeability, the antenna being positioned between the annular pipe section wall and the magnetic shield and the magnetic shield extending along a length of the antenna.

15. The transmission unit according to claim 11, wherein the antenna is constituted by a coil of magnetic wire.

* * * * *